US012339926B1

(12) United States Patent
Maier et al.

(10) Patent No.: US 12,339,926 B1
(45) Date of Patent: Jun. 24, 2025

(54) SYSTEMS AND METHODS FOR RISK FACTOR PREDICTIVE MODELING WITH DYNAMIC TRAINING

(71) Applicant: MASSACHUSETTS MUTUAL LIFE INSURANCE COMPANY, Springfield, MA (US)

(72) Inventors: Marc Maier, Springfield, MA (US); Sara Saperstein, Springfield, MA (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 1042 days.

(21) Appl. No.: 17/336,036

(22) Filed: Jun. 1, 2021

Related U.S. Application Data

(60) Provisional application No. 63/046,856, filed on Jul. 1, 2020.

(51) Int. Cl.
*G06F 18/2113* (2023.01)
*G06F 18/2431* (2023.01)
*G06N 20/00* (2019.01)
*G06V 10/75* (2022.01)

(52) U.S. Cl.
CPC ...... *G06F 18/2113* (2023.01); *G06F 18/2431* (2023.01); *G06N 20/00* (2019.01); *G06V 10/751* (2022.01)

(58) Field of Classification Search
CPC . G06N 20/00; G06F 18/2113; G06F 18/2431; G06V 10/751
See application file for complete search history.

(56) References Cited

U.S. PATENT DOCUMENTS

| 7,792,353 B2 | 9/2010 | Forman et al. |
| 10,063,575 B2 | 8/2018 | Vasseur et al. |
| 10,332,028 B2 | 6/2019 | Talathi et al. |

(Continued)

OTHER PUBLICATIONS

John Nillson et al., "Risk factor identification and mortality prediction in cardiac surgery using artificial neural networks", The Journal of Thoracic and Cardiovascular Surgery, pp. 12-19 (Year: 2006).*

(Continued)

*Primary Examiner* — Alan Chen
(74) *Attorney, Agent, or Firm* — Foley & Lardner LLP (57) ABSTRACT

A system and method for dynamic model training of a predictive machine learning model accesses data points of a training dataset including a plurality of model covariates. The predictive machine learning model is configured to generate an output including a risk rank representative of a mortality risk. The method selects one of the covariates and generates a historical data distribution for the selected covariate by applying the model to the training dataset including a plurality of historical application records. The method determines a current data distribution for the selected covariate. When comparison of the current data distribution with the historical data distribution indicates a data distribution shift exceeding a predetermined threshold, the method automatically updates parameters of the predictive machine learning model and retrains the predictive machine learning model using the updated parameters. Comparison of the current data distribution with the historical data distribution may employ covariate shift adaptation.

17 Claims, 7 Drawing Sheets

(56) References Cited

U.S. PATENT DOCUMENTS

| | | | | |
|---|---|---|---|---|
| 2016/0350671 A1* | 12/2016 | Morris, II | ........... | G05B 23/0229 |
| 2021/0334695 A1* | 10/2021 | Raj | ...................... | G06F 11/3409 |
| 2023/0129390 A1* | 4/2023 | Fusco | ...................... | G06N 5/01 |
| | | | | 706/12 |

OTHER PUBLICATIONS

Huillin Li et al, "Covariate Adjustment and Ranking Methods to Identify Regions with High and Low Mortality Rates", June, Biometrics, pp. 1-13 (Year: 2010).*

Eric Sijbrands et al., "Mortality Risk Prediction by an Insurance Company and Long-Term Follow-Up of 62,000 Men", PLoS ONE 4(5): e5457. doi:10.1371/journal.pone.0005457, pp. 1-6 (Year: 2009).*

Sharon Davis, et. al, "A nonparametric updating method to correct clinical prediction model drift", Oxford University Press on behalf of the American Medical Informatics Association, pp. 1448-1457 (Year: 2019).*

Mujkanovic, "Explaining the Predictions of Any Time Series Classifier," Bachelor of Science in IT-Systems Engineering, Hasso Plattner Institut, Jul. 26, 2019, 14 pages.

Rabanser, "Failing Loudly: An Empirical Study of Methods for Detecting Dataset Shift," 33rd Conference on Neural Information Processing Systems (NeurIPS 2019), Vancouver, Canada, 13 pages.

Schwab et al., "CXPlain: Causal Explanations for Model Interpretation under Uncertainty," Institute of Robotics and Intelligent Systems, ETH Zurich, 33rd Conference on Neural Information Processing Systems (NeurIPS 2019), Vancouver, Canada, 18 pages.

Storkey, "When Training and Test Sets are Different: Characterising Learning Transfer," Institute of Neural Computation School of Informatics, University of Edinburgh, Mar. 8, 2013, 25 pages.

* cited by examiner

SYSTEMS AND METHODS FOR RISK FACTOR PREDICTIVE MODELING WITH DYNAMIC TRAINING

CROSS-REFERENCE TO RELATED APPLICATION

The present application claims benefit of U.S. Provisional App. No. 63/046,856, filed Jul. 1, 2020, which is incorporated by reference in its entirety.

TECHNICAL FIELD

The present disclosure relates generally to predictive modeling.

BACKGROUND

Supervised machine learning techniques are employed in connection with learning parameters of respective predictive models. In supervised machine learning, a predictive model is configured to perform a prediction as a function of its learned parameters upon receipt of input data, sometimes called covariate data. Exemplary predictive models include binary classifiers, multiclass classifiers, and ranking algorithms, among others. In general, supervised machine learning techniques include a learning algorithm, which learns parameters of a predictive model to improve performance of the predictive model using a training dataset. Machine learning techniques also may include a test dataset, which can be held back from the training of the model and instead used to provide an unbiased estimate of model performance.

Supervised machine learning techniques are increasingly being used as black-box systems with the goal of outputting predictive models that produce high accuracy predictions in an automated fashion. Conventional machine learning techniques can become unreliable, however, when a training dataset does not follow the same probability distribution as a test dataset used in testing model performance. This attribute is sometimes called data distribution shift, or drift. One type of drift is non-stationarity, which refers to a drift in probability distribution of covariate data over time.

What is needed is improved methods for machine learning predictive modeling that incorporate assumptions for comparing training data to test data samples in order to detect data distribution shifts, and to identify drifts of covariate data that may materially impact model performance. What is needed is dynamic model training techniques that can mitigate data distribution shifts to improve model performance.

SUMMARY

Embodiments described herein aim to improve reliability of machine learning predictive models via dynamic model training. Embodiments described herein apply dynamic machine learning model training techniques to improve performance of an algorithmic underwriting machine learning model. Improved systems and methods for predictive modeling of mortality identify and address data distribution shifts of a model covariate representing a mortality risk factor. Embodiments described herein detect non-stationarity of a model covariate during a historical time period of a training dataset, and retrain the algorithmic underwriting model to mitigate temporal drift that degrades model performance.

In various embodiments, a processor-based method for dynamic model training of algorithmic underwriting predictive machine learning model accesses data points of a training dataset including a plurality of covariates of a predictive machine learning model. The predictive machine learning model is an algorithmic underwriting model configured to generate an output including a risk rank representative of a mortality risk. The method selects one of the plurality of covariates representing a risk factor of the predictive machine learning model, and generates a historical data distribution for the selected covariate by applying the predictive machine learning model to the training dataset. In various embodiments, the training dataset includes a plurality of historical application records.

The method determines a current data distribution for the selected covariate. When a comparison of the current data distribution with the historical data distribution indicates a data distribution shift exceeding a predetermined threshold, the method automatically updates one or more parameters of the predictive machine learning model. In that event, the method trains the predictive machine learning model using the updated parameters. In an embodiment, the predetermined threshold is a value of temporal drift of the current data distribution relative to the historical data distribution.

In various embodiments, in determining the current data distribution for the selected covariate, the method applies the predictive machine learning model to a test dataset. In an embodiment, the comparison of the current data distribution with the historical data distribution calculates a covariate shift of the current data distribution relative to the historical data distribution. In an embodiment, each of the historical application records includes a time metric falling within a time period of the historical application records, and the test dataset comprises data points including the time metric wherein the time metric falls within a recent time period.

In various embodiments, each of the historical application records includes a time metric falling within a time period of the historical application records. The historical application records may represent policies issued from the historical application records, and the time metric may be a policy date. The historical application records may represent policies declined or policies not taken from the historical application records, and the time metric may be an application date.

In updating one or more parameters of the predictive machine learning model, the method may employ various types of model updating used in model retraining. In an embodiment, model updating includes eliminating a selected covariate from the predictive machine learning model in model retraining. In an embodiment, model updating includes eliminating a selected covariate from the predictive machine learning model in model retraining if the selected covariate is not a high importance feature of the model. In an embodiment, model updating includes applying a temporal adjustment to the selected covariate in each of the plurality of historical application records in model retraining. In an embodiment, the temporal adjustment is based on a time metric of each of the historical application records.

In updating one or more parameters of the predictive machine learning model, the method may update an algorithmic rule for determining a contribution of a selected covariate to a risk rank. In an embodiment, updating an algorithmic rule reassigns a quantitative contribution of the selected covariate representing a risk score to a net risk score. The reassigned quantitative contribution may be based on a model prediction for the selected covariate. In an embodiment, updating an algorithmic rule reassigns the selected covariate to one of several risk classes. The reassignment to one of several risk classes may be based on a model prediction for the selected covariate.

A processor-based method comprises accessing, by a processor, a training dataset comprising data points including a plurality of covariates of a predictive machine learning model, wherein the predictive machine learning model is configured to generate an output comprising a risk rank representative of a mortality risk, wherein the training dataset comprises a plurality of historical application records; selecting, by the processor, one of the plurality of covariates representing a risk factor of the predictive machine learning model; generating, by the processor, a historical data distribution for the selected covariate by applying the predictive machine learning model to the training dataset; determining, by the processor, a current data distribution for the selected covariate; when a comparison of the current data distribution with the historical data distribution indicates a data distribution shift exceeding a predetermined threshold, automatically updating, by the processor, one or more parameters of the predictive machine learning model; and training, by the processor, the predictive machine learning model using the updated one or more parameters.

A system comprises an analytical engine server containing a processor configured to execute a plurality of non-transitory computer-readable instructions configured to: access a training dataset comprising data points including a plurality of covariates of a predictive machine learning model, wherein the predictive machine learning model is configured to generate an output comprising a risk rank representative of a mortality risk, wherein the training dataset comprises a plurality of historical application records; select one of the plurality of covariates representing a risk factor of the predictive machine learning model; generate a historical data distribution for the selected covariate by applying the predictive machine learning model to the training dataset; determine a current data distribution for the selected covariate; when a comparison of the current data distribution with the historical data distribution indicates a data distribution shift exceeding a predetermined threshold, automatically update one or more parameters of the predictive machine learning model; and train the predictive machine learning model using the updated one or more parameters.

Other objects, features, and advantages of the present disclosure will become apparent with reference to the drawings and detailed description of the illustrative embodiments that follow.

BRIEF DESCRIPTION OF THE DRAWINGS

Non-limiting embodiments of the present disclosure are described by way of example with reference to the accompanying figures which are schematic and are not intended to be drawn to scale. Unless indicated as representing the background art, the figures represent aspects of the disclosure.

DETAILED DESCRIPTION

In the following detailed description, reference is made to the accompanying drawings, which depict non-limiting, illustrative embodiments of the present disclosure. Other embodiments may be utilized and logical variations, e.g., structural and/or mechanical, may be implemented without departing from the scope of the present disclosure. To avoid unnecessary detail, certain information, items, or details known to those skilled in the art may be omitted from the following.

Embodiments described herein aim to improve reliability of machine learning predictive models via dynamic model training. Embodiments described herein apply dynamic machine learning model training techniques to algorithmic underwriting systems incorporating probabilistic machine learning models. The system and method of the present disclosure detect data distribution shifts, or drift, in one or more probabilistic predictive machine learning model. If a measurement of the detected drift exceeds a predetermined threshold, methods described herein update one or more parameters of the probabilistic machine learning model during model retraining to mitigate degradation of model performance due to the drift. In the present disclosure, data distribution shift or drift may refer to a difference between data distribution exhibited by a training data set of a predictive machine learning mode versus distribution of data observed during operational use of a predictive machine learning model. Data distribution shift or drift may refer to a difference between data distribution exhibited by a training data set of a predictive machine learning mode versus distribution of data of a test dataset used in testing model performance.

Data distribution shifts in predictive machine learning models can include distribution shifts or drifts in model inputs, called covariate shift, as well as drifts in model outputs. Data distribution shifts include shifts of probability distributions in probabilistic predictive machine learning models. In predictive machine learning models that incorporate time metrics, data distribution shifts can include temporal drift over a time period of the model. In present systems and methods, to maintain reliability of a predictive machine learning model, the model is retrained with one or more updated parameters to address a data distribution shift such as a temporal drift.

Embodiments described herein employ covariate shift adaptation to provide assumptions for relating training data to test data samples in predictive machine learning models. In covariate shift adaptation, training data input points and test input points follow different probability distributions. The target function for machine learning is unchanged between the training phase and the test phase, but the distributions of input points are different for training and test data.

Underwriting is the process an insurance company uses to determine whether or not a potential customer is eligible for insurance, and what rate that potential customer should pay for the insurance if eligible. Insurance underwriting seeks to spread risk among a pool of insured in a manner that is both fair to the customer and profitable for the insurer. One consideration is that it does not make sense for insurers to sell life insurance, for example, to everyone who applies for it. Additionally, although insurance companies do not intend to charge their customers excessively high rates, it is not prudent for them to charge all their policyholders the same premium. Underwriting enables the company to decline coverage to certain applicants, and to charge the remaining applicants premiums and to provide other policy terms that are commensurate with their level of risk.

Traditionally, underwriting has been a manual process. Underwriting can involve numerous people including agents and doctors, and it can be very time-consuming. Therefore, various entities have developed systems and methods to automate the underwriting process in order to improve decision-making, reduce the number of people involved, and accelerate the underwriting process. These systems and methods may be referred to as algorithmic underwriting.

Traditionally, most types of life insurance require an estimate of the expected lifetime of an individual at the time of application, commonly called the mortality risk. Conventional protocols for collecting and analyzing data that describes mortality risk are known as underwriting. Actuaries compute the cost of covering mortality risk over the lifetime of the policy and translate it into a set of premium payments required throughout a policy's term. Life insurance risk assessment has primarily consisted of point systems developed by medical doctors and experienced underwriters. Such protocols commonly calculate risk by mapping medical and behavioral attributes to point values that either debit or credit an overall score. A life insurance underwriter reviews an application to calculate the net number of points and to determine one of several risk classes that determine pricing according to aggregate mortality.

The system and method of the present disclosure apply machine learning methods to underwriting protocols. Algorithmic underwriting applies predictive modeling in the survival context, i.e., survival modeling. The underwriting predictive model is a probabilistic machine learning model develops estimates of survival modeling functions with respect to a set of observed covariates in order to predict mortality outcomes. Survival modeling functions can include, e.g., one or more of the survival function, hazard function, and cumulative hazard function.

In survival analysis, the outcome of interest is time duration until a binary event may occur for a particular record. The objective of survival analysis is to approximate the survival function, $S(t)=P\gamma(T>t)$, which describes the probability that an event, occurring at random variable time T, occurs later than some given time. The hazard function is the rate of the event at time/conditioned on having survived until time t. In actuarial science, the hazard function describes the mortality rate for a given attained age. The cumulative hazard function is the integral of the hazard function, which is related to the survival function as $A(t)=-\log S(t)$.

The primary goal of predictive machine learning modeling as applied to survival modeling is to develop estimates of the survival, hazard, or cumulative hazard functions with respect to a set of observed covariates. In algorithmic underwriting for mortality, the event is mortality, and the covariates generally include mortality risk factors such as medical attributes and behavioral attributes of applicants for life insurance products.

The predictive machine learning module inputs a plurality of variables of the electronic application, also herein called covariates or covariate data, into a machine learning model utilizing survival modeling. In various embodiments, the machine learning model is trained by inputting a training dataset into the predictive machine learning module. In disclosed embodiments, the training dataset includes a plurality of data points, representing a plurality of historical application records.

In embodiments described herein, a predictive machine learning model is configured to output a rank or quantitative score representative of a mortality risk associated with an electronic application received for underwriting, also herein called a "risk rank." Risk ranks may include, for example quantitative risk scores, percentiles, and binary risk outcomes. Risk ranks can include the user's percentile within the score distribution for a population of general users, together with the score of the particular user. Risk ranks can define one or more bins as percentile ranges in a percentile distribution for a population of general users. Risk ranks may be a binary outcome, such as "pass" or "fail." Risk ranks can take the form of a quantitative risk score, such as net number of points, for the user. A risk rank can translate this risk score into one of several coarse-grained risk ranks, also herein called "risk classes." Risk scoring can rank cases by the likelihood of belonging to one risk class or the other. Risk ranks can include a risk class to which the user has been assigned. For example, the user may be assigned to UPNT for non-smokers or SPT for self-reported smokers.

As used in the present disclosure, a "risk factor" is any variable associated with mortality risk. In certain embodiments, machine learning underwriting protocols require collection of body fluids and various physical measurements and include clinical assessments in the data that describe mortality risk factors. A risk factor may be associated with a health outcome or state, such as a risk of disease, infection and/or health-related event, e.g., a stroke, diabetes, heart attack, cancer, and death. Risk factors may, or may not, have a causal relationship with a health outcome or state. In the present disclosure, risk factors derived from collection and analysis of body fluids and various biophysical measurements are sometimes called "clinical risk factors," or "medical risk factors." The collected medical data for these clinical assessments (e.g., body fluids and biophysical measurements) are sometimes called "clinical data" herein.

Clinical data collected in medical examinations in support of conventional applications for life insurance are typically employed to assess the applicant's health, to confirm information include in the application, and to screen for illegal drug use. Much of the collected clinical data is also obtained from other sources during the application process, and clinical test results and answers to examination questions are typically checked for consistency with the other sources.

Clinical data are a point-in-time view into an individual's health. Underwriting ties various clinical data to all-cause mortality predictions and to specific causes of mortality. Clinical assessments based on collected blood and urine samples typically test the collected fluids to screen for dozens of indicators of diseases and conditions (health indicators). Examples of clinical assessment risk factors include HIV and AIDS; sexually transmitted diseases (STD); cholesterol, (including LDL and HDL) and triglycerides (e.g., as indicators of heart disease risk factors); hemoglobin A1C, fructosamine and glucose levels (e.g., as indicators of diabetes); creatinine, hemoglobin and proteins (e.g., as indicators of kidney disease); and urine acidity (e.g., as indicator of impaired kidney function or diabetes). Typical medical examinations also screen for nicotine and cotinine in the urinalysis in order to determine tobacco usage. Additionally, clinical assessments may include biophysical examinations such as weighing the applicant and questioning the applicant, e.g., about lifestyle.

In embodiments disclosed herein, algorithmic underwriting employs a survival predictive model trained using data from a large corpus of historical applications based on traditional underwriting protocols, in conjunction with public data sources. The public data sources can provide information about non-clinical risk factors, such as behavioral data, for applicants for insurance. Model covariates can include clinical risk factors as well as non-clinical risk factors.

Applicant has observed that certain model covariates exhibit data distribution shift over a historical time period associated with a corpus of historical applications in a training dataset. In the case of model covariates representing mortality risk factors, over a historical time period of the training data applicant populations have shown pronounced data distribution shifts that can have a material impact on model performance. Examples include a trend of a health indicator and its causal relationship with a certain health outcome or state, and a decreasing trend of a behavior that has a causal relationship with mortality risk. Data distribution shifts of underwriting model covariates, including temporal drifts, can manifest for broad underlying populations of historical applicants such as age-sex cohorts. These data distribution shifts can also manifest for narrower subpopulations. Systems and methods of the present disclosure detect data distribution shifts for given model covariates, and improve model performance via model retraining with appropriate updates to one or more model parameters.

Figure 1:
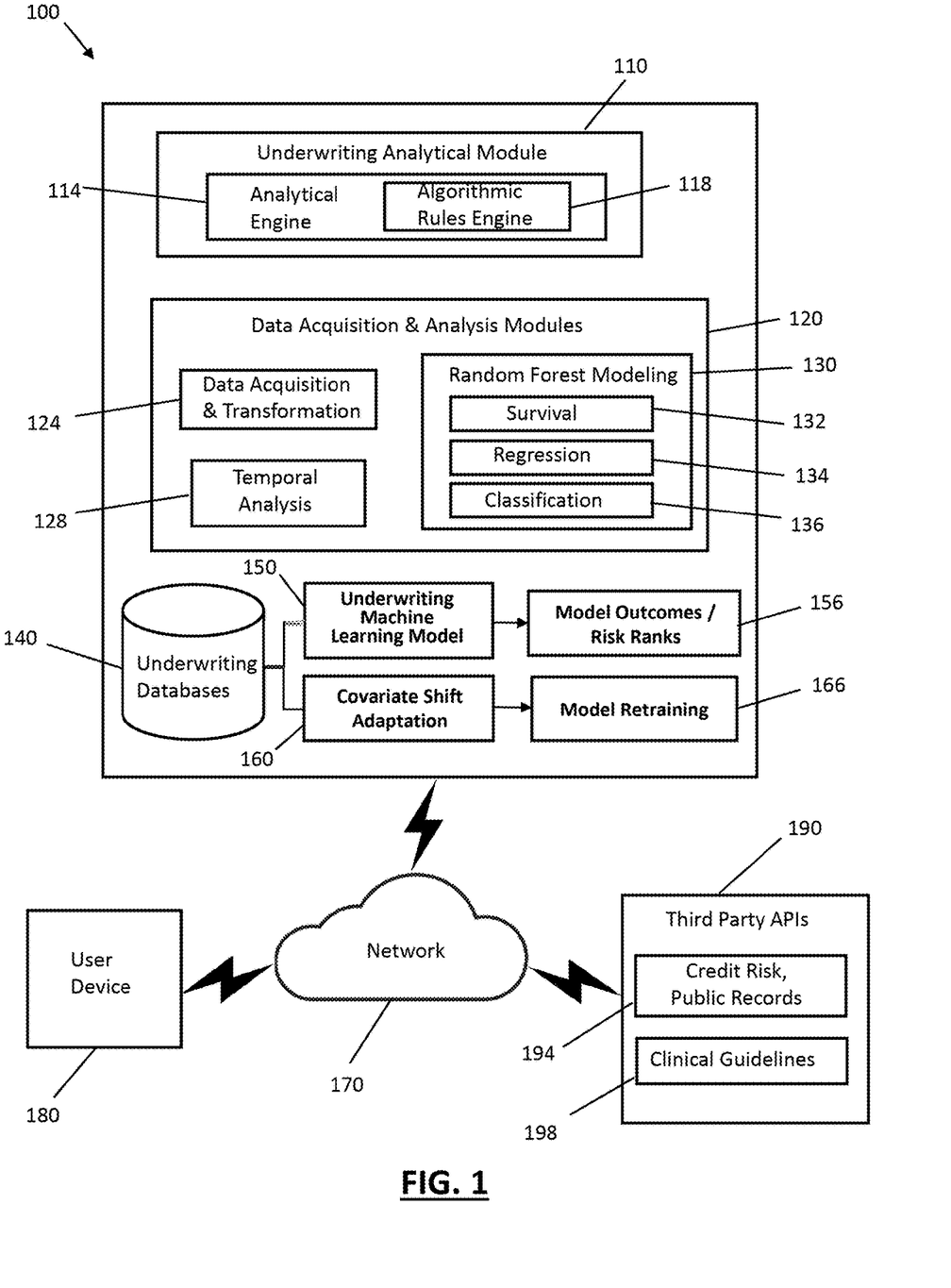
FIG. 1 is a system architecture for a machine learning underwriting system including covariate shift adaptation and dynamic model training, according to an embodiment.

FIG. 1 shows a system architecture for algorithmic underwriting system 100 including covariate shift adaptation and model retraining, also herein called risk factor machine learning predictive modeling with dynamic training. Algorithmic underwriting system 100 may be hosted on one or more computers (or servers), and the one or more computers may include or be communicatively coupled to one or more databases. Algorithmic underwriting system 100 can effect probabilistic predictive modeling of mortality risk factors as model covariates, i.e., model inputs. In various embodiments, model covariates include either or both clinical risk factors and non-clinical risk factors for applicants for life insurance products or other financial products. In some embodiments, algorithmic underwriting system 100 manages predictive modeling of mortality risk factors that exclude clinical assessment risk factors for applicants for life insurance or other financial products of a sponsoring enterprise for an expedited underwriting process that does not require collection of clinical data for applicants.

A sponsoring enterprise for algorithmic underwriting system 100 may be an insurance company or other financial services company, which may be represented by insurance agents or advisors. In some cases, an insurance agent may be associated with only a single insurance provider (sometimes referred to as a "captive" insurance agent). In other cases, an "independent" insurance agent, sometimes called an insurance broker, may be associated with several different insurance providers. A user (customer or customer representative) can submit a digital application via user device 180, and the digital application may be received by algorithmic underwriting system 100 assigned to an agent or advisor.

Underwriting analytical module 110 includes an analytical engine 114 and an algorithmic rules engine submodule 118. Algorithmic rules engine submodule 118 executes thousands of automated rules encompassing health, behavioral, and financial attributes collected through digital applications and through real-time vendor APIs 190. In some examples, the real-time vendor APIs 190 may provide credit risk and public records datasets 194. Additionally or alternatively, the real-time vendor APIs 190 may provide clinical guidelines 198. In some underwriting embodiments, the automated rules executed by algorithmic rules engine 118 include clinical assessment risk factors as model covariates. In other underwriting embodiments, the automated rules executed by algorithmic rules engine 118 exclude clinical assessment risk factors.

Analytical engine 114 can be executed by a server, one or more server computers, authorized client computing devices, smartphones, desktop computers, laptop computers, tablet computers, PDAs and other types of processor-controlled devices that receive, process, and/or transmit digital data. Analytical engine 114 can be implemented using a single-processor system including one processor, or a multi-processor system including any number of suitable processors that may be employed to provide for parallel and/or sequential execution of one or more portions of the techniques described herein. Analytical engine 114 performs these operations as a result of central processing unit executing software instructions contained within a computer-readable medium, such as within memory. As used herein, a module may represent functionality (or at least a part of the functionality) performed by a server and/or a processor. For instance, different modules may represent different portion of the code executed by the analytical engine server 114 to achieve the results described herein. Therefore, a single server may perform the functionality described as being performed by separate modules.

In one embodiment, the software instructions of the system are read into memory associated with the analytical engine 114 from another memory location, such as from a storage device, or from another computing device via communication interface. In this embodiment, the software instructions contained within memory instruct the analytical engine 114 to perform processes described below. Alternatively, hardwired circuitry may be used in place of, or in combination with, software instructions to implement the processes described herein. Thus, implementations described herein are not limited to any specific combinations of hardware circuitry and software.

Figure 2:
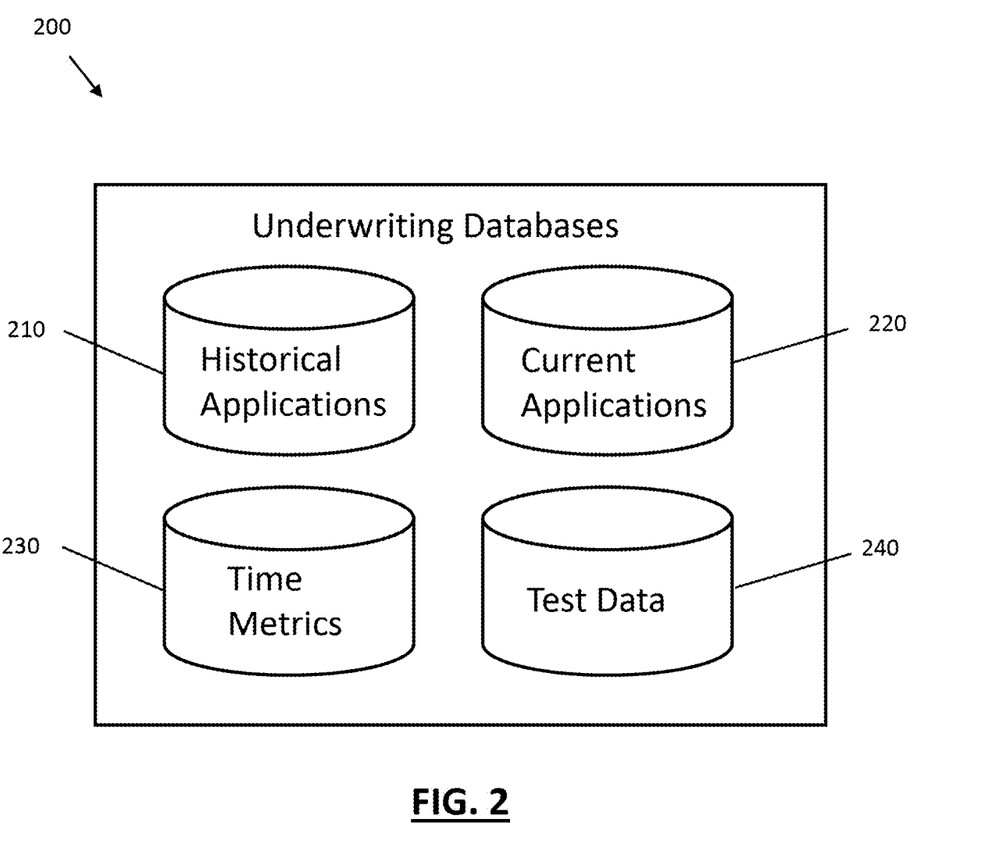
FIG. 2 illustrates databases for a machine learning underwriting system including covariate shift adaptation and dynamic model training, according to an embodiment.

Underwriting databases 140 consist of various databases employed in algorithmic underwriting and in dynamic model training. In the embodiment of FIG. 2, underwriting databases 200 include historical applications database 210, current applications database 220, time metrics database 230, and test data database 240. Underwriting databases 140, 200 are organized collections of data, stored in non-transitory machine-readable storage. The databases may execute or may be managed by database management systems (DBMS), which may be computer software applications that interact with users, other applications, and the database itself, to capture (e.g., store data, update data) and analyze data (e.g., query data, execute data analysis algorithms). In some cases, the DBMS may execute or facilitate the definition, creation, querying, updating, and/or administration of databases. The databases may conform to a well-known structural representational model, such as relational databases, object-oriented databases, or network databases. Example database management systems include MySQL, PostgreSQL, SQLite, Microsoft SQL Server, Microsoft Access, Oracle, SAP, dBASE, FoxPro, IBM DB2, LibreOffice Base, and FileMaker Pro. Example database management systems also include NoSQL databases, i.e., non-relational or distributed databases that encompass various categories: key-value stores, document databases, wide-column databases, and graph databases.

In an example, underwriting models 150 were trained against a large corpus of historical underwriting applications 210. In an embodiment, data acquisition and transformations module 124 applied data transformation procedures to the historical application data to yield an extensive training dataset with engineered features having improved predictive values. In an example, model training curated a data set on the scale of one million historical applications 210, wherein model covariates included then-current risk factors of the applicants. The trained models produced high-resolution, individual mortality scores. Historical applications database 210 included data obtained from an extended time period. This presented the challenge of taking into account potential data distribution shifts or non-stationarity of training data, such as a decreasing trend of certain lab values over the time period of the historical applications.

Current Applications database 220 stores current data on applications for underwriting. In production, applicants for a life insurance product or other financial product submit an electronic application for underwriting the requested financial product. A user can submit electronic application data via inputs at user device 180, for transmission via network 170 and storage in underwriting databases 140, such as current applications database 220. Alternatively, this data may be submitted via paper application and digitized for storage.

In various embodiments, Time Metrics database 230 stores time metrics for historical underwriting applications and for current underwriting applications. Given an understanding of the historical underwriting applications in the training dataset, model training of the underwriting models 150 employed temporal analysis 128 to associate training data points with time metrics of the historical applications. In an embodiment, time metrics generated by temporal analysis 128 are stored in time metrics database 230. Time metrics database 230 may store historical time metrics of issued policies and policies declined or not taken tracked in historical application database 210. Time metric database 230 may store current time metrics for pending applications tracked in current applications database 220. In an embodiment, a time metric for issued policies is policy date. In an embodiment, a time metric for pending applications or for policies declined or not taken is application date.

In various embodiments, algorithmic underwriting system continually monitors model inputs and outputs. Distributional drift can manifest in the system, affecting quality of the predictions. As described below, system 100 monitors performance using test data 240 that has been held back from model training data. In an embodiment, test data 240 represents a separate test dataset of applicants that have previously been processed via algorithmic underwriting during a recent time period. The test dataset 240 resembles a representative cross section of algorithmically underwritten business and in an embodiment, the test dataset filters out pending applications.

Figure 3:
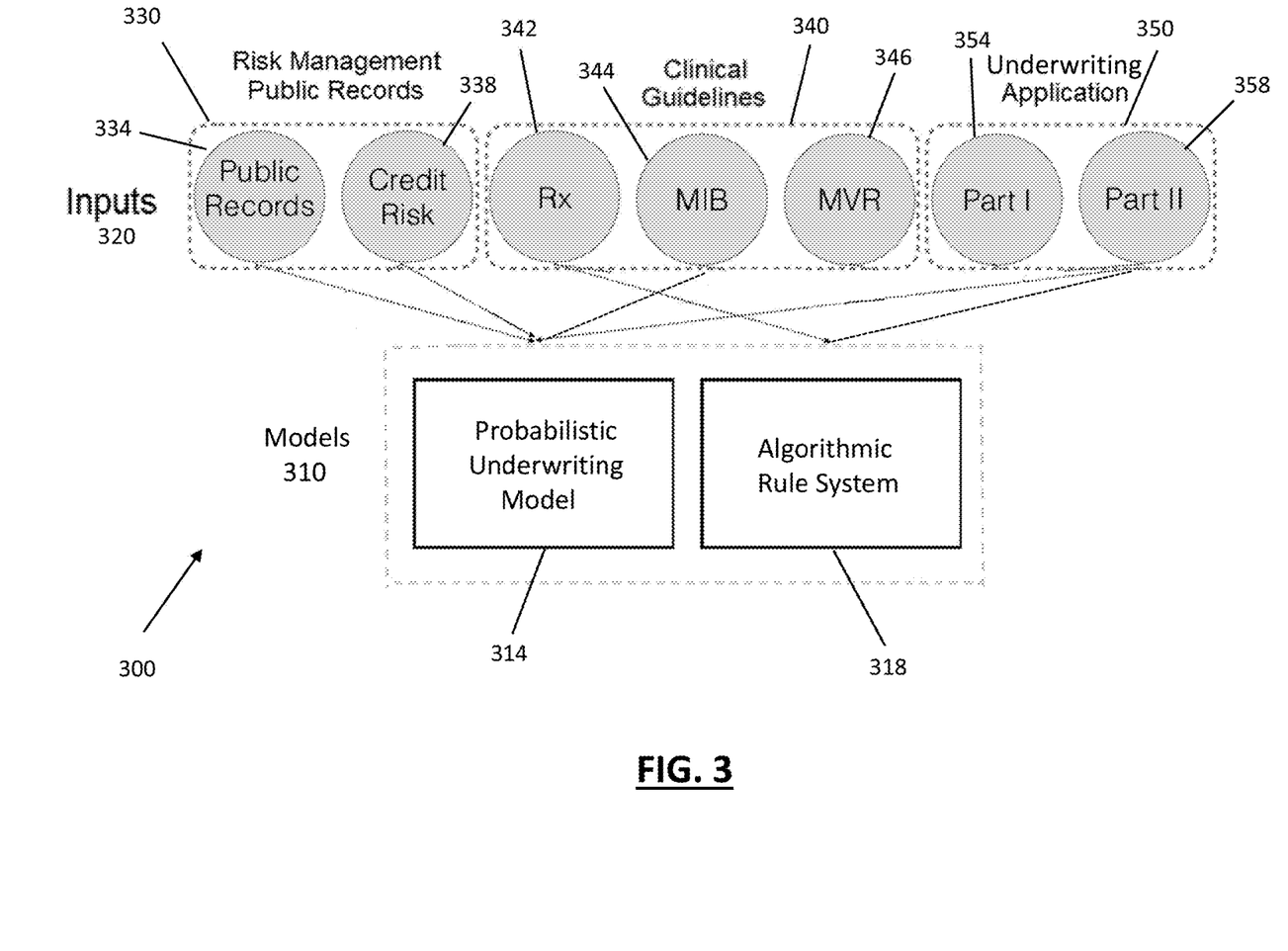
FIG. 3 is a schematic diagram of input data sources and models for algorithmic underwriting, according to an embodiment.

The algorithmic underwriting system may include one or more underwriting machine learning predictive models 150, such as a probabilistic underwriting model 314 (FIG. 3).

Underwriting models 150 comprise machine learning models that can be trained on various sets of training data. Suitable machine learning model classes include but are not limited to random forests, logistic regression methods, support vector machines, gradient tree boosting methods, nearest neighbor methods, and Bayesian regression methods.

In an embodiment, underwriting models 150 use one or more models 132, 134, and 136 within the Random Forests ensemble 130 for Survival, Regression, and Classification (RF-SRC). Random Forest Modeling module 130 serves as a general, reusable framework that yields relatively parsimonious models while optimizing the specific objective of each model. In Random Forests methods, ensemble learning is improved by injecting randomization into the base learning process. RF-SRC extends Random Forests methods and provides a unified treatment of the methodology for models including right censored survival (single and multiple event competing risk), multivariate regression or classification, and mixed outcome (more than one continuous, discrete, and/or categorical outcome). When one continuous or categorical outcome is present, the model reduces to univariate regression or classification, respectively.

An example machine learning underwriting model incorporated a Random Forests Survival framework 132 in combination with Regression framework 134. Random Forests Survival model 132 incorporated concordance indexing, a performance metric based on the fraction of observations with higher performance time that has a higher probability of predicted survival. Regression framework 134 enabled more efficient model development in dealing with hundreds of predictors and iterative feature selection.

Random forests models for classification (framework 136) work by fitting an ensemble of decision tree classifiers on sub samples of the data. Each tree only sees a portion of the data, drawing samples of equal size with replacement. Each tree can use only a limited number of features. By averaging the output of classification across the ensemble, the random forests model can limit over-fitting that might otherwise occur in a decision tree model.

Model training can use 10-fold cross validation and a grid-search of relevant hyperparameters (number of trees, minimum size of terminal nodes) for random forests. The predictive machine learning models can identify features that have the most pronounced impact on predicted value. Different types of underwriting model may identify different features as most important. The predictive value of model features of an example random forests survival model was measured using the minimal depth of a maximal subtree (7), i.e., shortest distance from the root node to the parent node of the maximal subtree, as a variable importance metric. As applied within the global structure of the random forests ensemble, the minimal depth of a maximal subtree is an efficient importance metric, which is faithful to the global structure of the model and is independent of model task and the values calculated at terminal nodes.

Underwriting models 150 can apply machine learning predictive modeling to underwriting databases 140 and to third-party data 190 to derive model outcomes 156. Model outcomes 156 can include risk scoring information, and underwriting decisions, e.g., for users who have submitted an electronic application for insurance. Outcomes 156 can include various types of risk ranks, and can include a risk class to which the user has been assigned. For example, the user may be assigned to an ultra-preferred non-tobacco risk class (upnt), a standard-preferred non-tobacco risk class (spnt), or a non-tobacco risk class (nt).

Algorithmic underwriting system 100 incorporates a Covariate Shift Adaptation module 160 that monitors model inputs and outputs, and a Model Retraining module 166 that dynamically retrains Underwriting Machine Learning Model 150 as needed to maintain model performance. In an embodiment, Covariate Shift Adaptation module 160 monitors model covariates to detect data distributional shifts that can affect quality of model predictions. As described below, system 100 monitors performance using test data 240 that has been held back from model training data. Covariate Shift Adaptation 160 provides assumptions relating training data to test data samples in predictive machine learning model 150. In covariate shift adaptation, training data input points and test input points follow different probability distributions. The target function for machine learning is unchanged between the training phase and the test phase, but the distributions of input points are different for training data versus test data.

In various embodiments, Covariate Shift Adaptation 160 compares a training dataset including a plurality of historical application records from Historical Applications database 210 with a test dataset including records from Test Data database 240. In an embodiment, for a selected covariate of the Underwriting Machine Learning Model 150, Covariate Shift Adaptation 160 determines a current data distribution for the selected covariate by applying the predictive machine learning model to a test dataset obtained from Test database 240, and calculates a covariate shift of the current data distribution relative to a historical data distribution of a training dataset obtained from Historical Applications database 210.

In an embodiment, Analytical Engine 114 in coordination with Covariate Shift Adaptation 160 compares the calculated covariate shift with a predetermined threshold. In the event the covariate shift exceeds the predetermined threshold, the data distribution shift exceeding a predetermined threshold, Analytical Engine 114 in conjunction with Model Retraining module 166 automatically updates one or more parameters of the predictive machine learning model 150 and retrains the predictive machine learning model using the updated one or more parameters. In an embodiment, the underwriting machine learning model may be retrained periodically to incorporate refreshed data and performance enhancements. Periodic updates in a retrained model can include refreshed death information and including in the dataset additional applications that have been underwritten.

FIG. 3 shows a simplified schematic of a system 300 for evaluating program-eligible applicants for approval to receive an underwriting offer. System 300 requests inputs 320 from various third-party APIs and receives digital underwriting applications. System 300 tests inputs 320 via underwriting models 310 in order to determine whether to present an underwriting offer to the applicant and the terms of such offer.

System 300 acquires risk management public records 330, including public records 334 and credit risk 338; clinical guidelines 340, including Rx data 334, MIB data 344, and MVR data 346; and underwriting applications 350, including Clinical Applications Part I 354 and Clinical Applications Part II 358. Three of these sources are traditional underwriting sources: Clinical Applications Part I 354, client medical interviews ("CMI"; application part II 358), and prescription drug histories (Rx data 342). Unlike underwriting systems that omit the requirement that the user submit clinical data in the application (Clinical Applications Part I 354), clinical underwriting 300 requires that data. Data sources of system 300 may include one or more nontraditional underwriting sources—risk management public records 330 such as public records 334 and credit risk data 338, MIB data 344 and MVR data 346.

Figure 4:
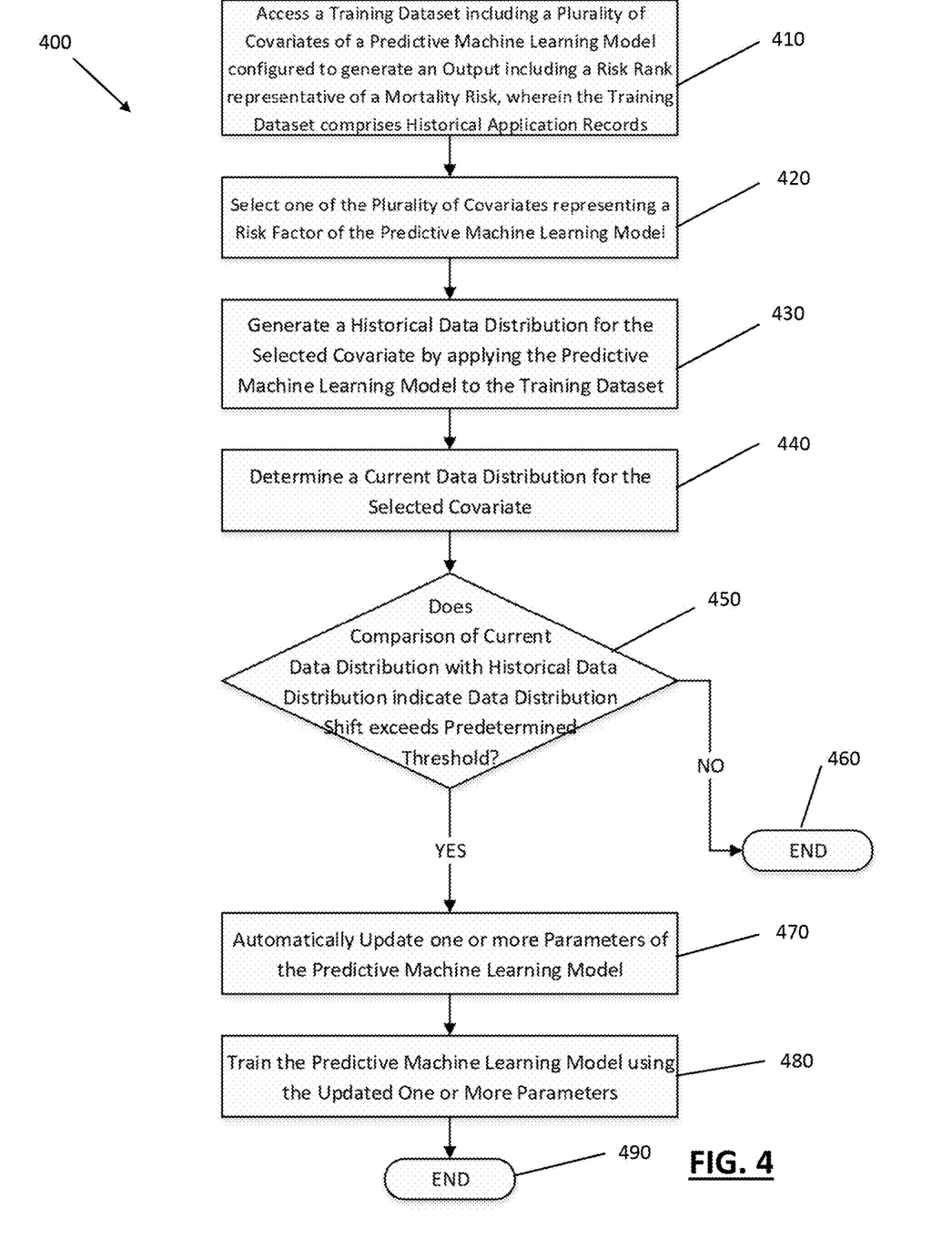
FIG. 4 is a flow chart diagram of a protocol for testing algorithmic underwriting model performance and for improving model performance via dynamic model training, according to an embodiment.

If the processor determines that a comparison of the current data distribution with the historical data distribution does not indicate a data distribution shift exceeding a predetermined threshold, the method ends at step 460. If the processor determines that a comparison of the current data distribution with the historical data distribution does indicate a data distribution shift exceeding a predetermined threshold, in step 470, the processor automatically updates one or more parameters of the predictive machine learning model. In this event, in step 480, the processor trains the predictive machine learning model using the updated parameters. The method ends at step 490 after the processor trains the predictive machine learning model.

Inputs 320 from these various data sources may serve as model covariates for algorithmic underwriting system, and system 300 may incorporate the covariate shift adaptation and model retraining techniques of the present disclosure. Covariate shift adaptation and model retraining may be applied to data distribution shifts associated with model inputs 320 including clinical risk factors (e.g., medical risks) and non-clinical risk factors (e.g., behavioral risks).

Public records include attributes that pertain to individual-level records that are filed by a public office, such as addresses, education, licenses, property, assets, and financial disclosures. Example public records attributes include the number of lien records on file, time since the most recent bankruptcy filing, number of evictions, and the tax-assessed value of the individual's current address. Public records data set 334 is acquired via third-party API 190. Credit risk data include attributes with information that pertains to credit behavior, such as types of open accounts, account balances, derogatory remarks, collections, and bankruptcies. Example credit risk data attributes include the number of collections, ratio of amount past due to amount of total balances, and number of open auto finance accounts. Credit risk data set 338 is acquired via third-party API 190.

The client medical interview (CMI) data set 358 consists of an extensive questionnaire filled out by life insurance applicants. This digital questionnaire covers personal and family health history and behavioral topics. Behavioral topics include motor vehicle violations, smoking, and other topics pertaining to behavioral risks. Digital CMI data 358 and Application Part I data 354 are received via user inputs at user device 180, transmitted via network 170 and stored in Current Applications database 220. Alternatively, applications data are received via paper application and are digitized for storage.

Prescription drug histories data (Rx 342) contains historical prescription drug fills for applicants. Example Rx 342 contained a seven (7) year history per applicant. Each fill record included the drug generic name, brand name, NDC (National Drug Code), priority, days' supply, quantity, prescription fill date, physician name, registration number, and specialty. The Rx data set constructed during model building contained data for thousands of applicants, including more millions of prescription fill records.

Algorithmic Rule System 318 stores and applies rules that reflect a comprehensive set of medical and underwriting guidelines developed by experts in underwriting and insurance medicine, including rules based on clinical laboratory data. Each rule determines the best available risk class in the presence of certain values in the application. Algorithmic Rule System 318 executes all rules across data retrieved from various data sources 320.

Probabilistic Underwriting Model 314 predicts mortality risk of a given individual relative to the individual's age and sex cohort, based on clinical assessment risk factors and non-clinical risk factors. In determining model outcomes 156, Probabilistic Underwriting Model 314 in conjunction with Algorithmic Rule System 318 can determine a risk score and risk percentile for the applicant, and assigns the applicant to a risk class. Model retraining 166 can update one or more parameters of probabilistic underwriting model 314, algorithmic rule system 318, or both of these models.

In building the predictive models of the present disclosure, model datasets may have populations in the hundreds of thousands or millions of individuals. An example probabilistic underwriting model 314 was built from historical underwriting applications. A data extract of the historical applications contained 1,333,357 (non-unique) individuals who applied between 1999 and 2016 for insurance products. Data preprocessing 124 retained applicants with no missing CMI, BMI, or public records, yielding a training dataset of around 230,000 historical applications 144. In an example, the Rx data set 342 constructed during model building contained data for more than 120,000 applicants, including more than three million prescription fill records. Temporal analysis 128 generated time metrics 230 based on policy date for training data points representing issued policies, and generated time metrics based on application date for training data points representing policies declined or policies not taken.

In a processor-based method 400 for risk factor machine learning predictive modeling with dynamic training as shown in FIG. 4, at step 410, the processor accesses a training dataset comprising data points including a plurality of covariates of a predictive machine learning model. The predictive machine learning model is configured to generate an output comprising a risk rank representative of a mortality risk, wherein the training dataset comprises a plurality of historical application records. The historical application records can represent one or more of policies issued from the historical application records, and policies declined or policies not taken from the historical application records.

The risk rank may include, for example quantitative risk scores, percentiles, and binary risk outcomes. The risk rank can include the user's percentile within the score distribution for a population of general users, together with the score of the particular user. Risk ranks can define one or more bins as percentile ranges in a percentile distribution for a population of general users. The risk ranks may be a binary outcome, such as "pass" or "fail." The risk rank can take the form of a quantitative risk score, such as net number of points, for the user. The risk rank can translate this risk score into one of several risk classes.

At step 420, the processor selects one of the plurality of covariates representing a risk factor of the predictive machine learning model. The selected risk factor may represent a clinical risk factor or a non-clinical risk factor of the predictive machine learning model.

At step 430, the processor generates a historical data distribution for the selected covariate by applying the predictive machine learning model to the training dataset. In various embodiments, each of the historical application records includes a time metric falling within a time period of the training dataset. The time metric for each data point of the training dataset may be a policy date of an issued policy or an application date of an underwriting application, among other possibilities.

At step 440, the processor determines a current data distribution for the selected covariate. In determining the current data distribution, the processor can apply the predictive machine learning model to a test dataset. Each data point of the test dataset can include a time metric falling within a recent time period of the test data.

At step 450, the processor determines whether a comparison of the current data distribution with the historical data distribution indicates a data distribution shift exceeding a predetermined threshold. In an embodiment, the comparison of the current data distribution with the historical data distribution applied covariate shift adaptation to calculate a covariate shift of the current data distribution relative to the historical data distribution. The covariate shift can represent a temporal data distribution shift, i.e., temporal drift. The predetermined threshold may be a value of temporal drift.

If the processor determines that a comparison of the current data distribution with the historical data distribution does not indicate a data distribution shift exceeding a predetermined threshold, the method ends at step 460. If the processor determines that a comparison of the current data distribution with the historical data distribution does indicate a data distribution shift exceeding a predetermined threshold, in step 470, the processor automatically updates one or more parameters of the predictive machine learning model. In this event, in step 480, the processor trains the predictive machine learning model using the updated parameters.

In automatically updating one or more parameters of the predictive machine learning model in step 470, the processor may employ various techniques. In one embodiment, model updating includes eliminating a selected covariate from the predictive machine learning model in model retraining. In another embodiment, model updating includes eliminating a selected covariate from the predictive machine learning model in model retraining if the selected covariate is not a high importance feature of the model. In another embodiment, model updating includes applying a temporal adjustment to the selected covariate in each of the plurality of historical application records in model retraining. The temporal adjustment may be based on a time metric of each of the historical application records.

In step 470, the processor may update an algorithmic rule for determining a contribution of a selected covariate to a risk rank. Updating an algorithmic rule may reassign a quantitative contribution of the selected covariate representing a risk score to a net risk score. The reassigned quantitative contribution may be based on a model prediction for the selected covariate. The processor then retrains 480 the predictive machine learning model with the reassigned quantitative contribution of the selected covariate by inputting the training dataset of historical underwriting application records.

In step 470, the processor may reassign the selected covariate to one of several risk classes. The reassignment to one of several risk classes may be based on a model prediction for the selected covariate. The processor then retrains 480 the predictive machine learning model with the selected covariate assigned to a reassigned risk class by inputting the training dataset of historical underwriting application records.

In step 470, the processor may reassign mortality risk score thresholds of a plurality of risk classes of the predictive machine learning model for underwriting a life insurance product based on modified risk class cutoff values. The processor then retrains 480 the predictive machine learning model with the reassigned mortality risk score thresholds by inputting the training dataset of historical underwriting application records.

Embodiments disclosed herein use additive feature attribution techniques to approximate the outputs of survival mortality models in "interpretable" outputs. Additive feature attribution is a technique used to approximate the output of a complicated multivariate function as a linear one on a binary feature space. By building a model in this binary space, the linear coefficients represent the effect of the "presence" or "absence" of a feature on the model's output. In embodiments disclosed herein, additive feature attribution can be employed in combination with dynamic model retraining to analyze selected model covariates and make appropriate updates to the predictive machine learning underwriting model.

Additive feature attribution can employ a SHAP algorithm using Shapley values, a technique used in game theory to determine how much each player in a collaborative game has contributed to its success. A SHAP value measures an impact of variables taking into account the interaction with other variables. Shapley values calculate an importance of a feature by comparing what a model predicts with and without the feature.

Figure 5:
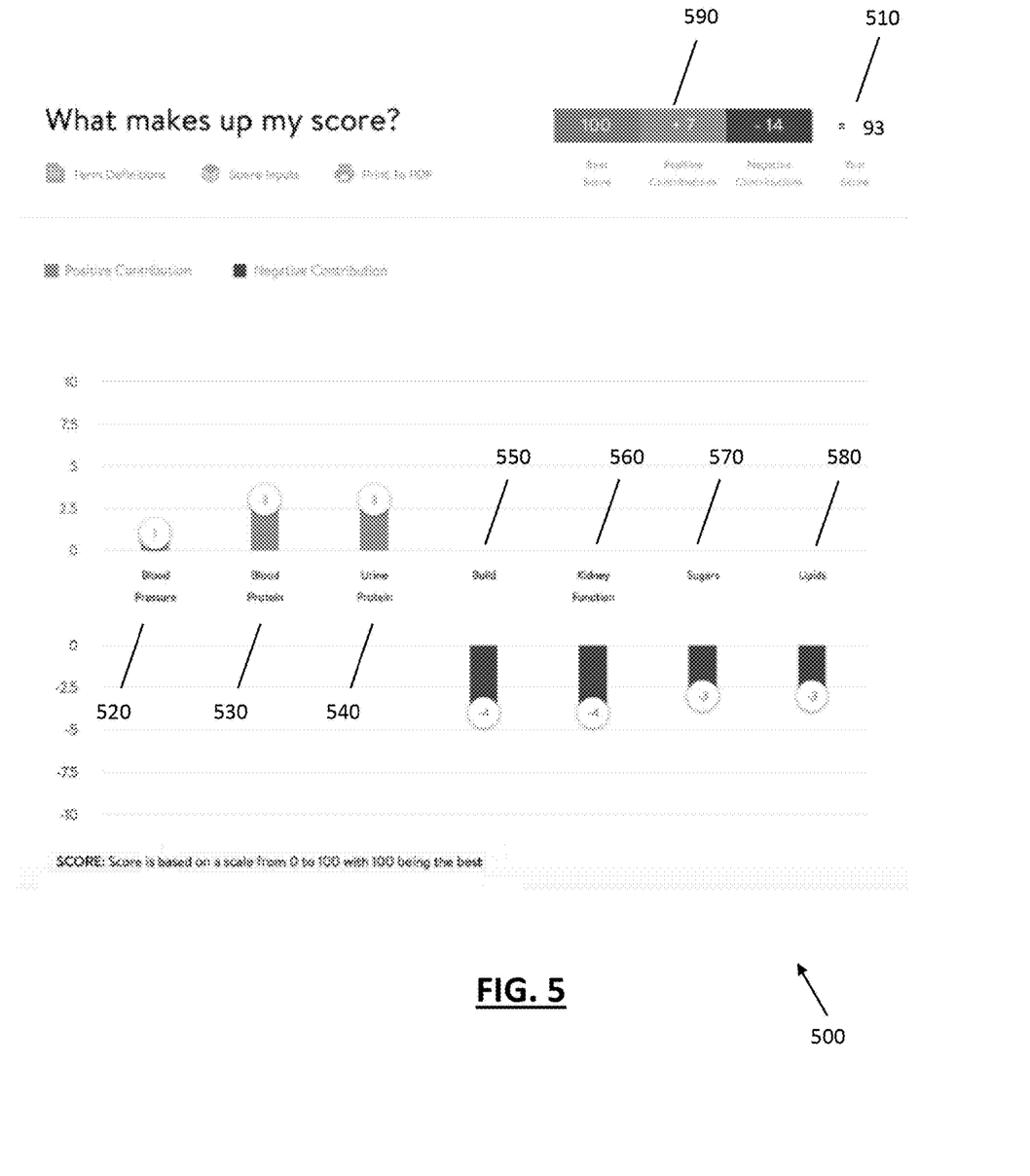
FIG. 5 displays a schematic diagram of a machine learning underwriting model prediction including additive contributions to a risk score, according to an embodiment.

FIG. 5 illustrates an interpretable output 500 of a machine learning underwriting model prediction including a quantitative score, showing additive contributions to the quantitative score. These additive contributions quantify contributions of a set of features to the quantitative score. The quantitative score is a risk score 510 based on the scale from 0 to 100, where 100 represents the lowest risk (healthiest) and 0 represents the most risky. An additive feature attribution explanation model assigned each feature an importance value for this particular prediction. The diagram 500 represents additive contributions via vertical bars of respective lengths corresponding to the size of each contribution, in which upward bars have a positive value and downward bars have a negative value. Explanation 500 shows features 520, 530, and 540 that made positive contributions to the risk score 510, and features 550, 560, 570, and 580 that made negative contributions to the risk score 510. Summing 590 the effects of all feature attributions approximates the quantitative score output 510 of the original underwriting predictive model.

As depicted, the analytical engine server may generate a report to be displayed for the user (e.g., end user and/or an administrator), such as the explanation 500. The explanation 500 may include an overall risk score 510, which is calculated based on positive and negative contributions (e.g., additive contributions). To further describe the risk score 510, the explanation 500 also displays categories that have positively or negatively impacted risk score 510 (e.g., features 520-580). Each feature may correspond to an additive contribution that is used to calculate the risk score 510. Thereby, viewing the features 520-580 allows the end user to understand and interpret the risk score 510.

Each feature may also include a graphical indicator corresponding to the magnitude of each respective feature and its impact on the score 510. For instance, the features depicted in FIG. 5 may have a corresponding vertical bar where the length of each bar represents the magnitude of each feature. In contrast, the direction of each vertical bar represents whether each feature has impacted the score 510 in a negative or positive way. Each feature may also include a numerical score. Using the graphical elements depicted in FIG. 5, the end user can easily interpret important factors that have caused the analytical engine server to calculate the risk score 510.

For instance, feature 530 graphically describes that the end user's blood protein has positively impacted his/her risk score. The height of the vertical bar for the feature 530 illustrates that the end user's blood protein has a more significant impact on the end user's score than his/her blood pressure. In contrast, feature 560 illustrates that the end user's kidney function has negatively impacted the user's risk score.

In some embodiments, the analytical engine server may allow the user to simulate future scores by adjusting one or more additive contributions depicted in the explanation 500. For instance, the features 520-580 may include an adjustable/interactive graphical element where the user can revise the scores to identify how the overall score would be impacted. For instance, the end user may change the score for lipids (i.e., feature 580) by interacting with the feature 580 (e.g., interacting with the vertical bar and adjusting its height or direction). The analytical engine server may then execute covariate shift adaptation and dynamic model retraining described herein to recalculate the user's risk rank.

Figure 6:
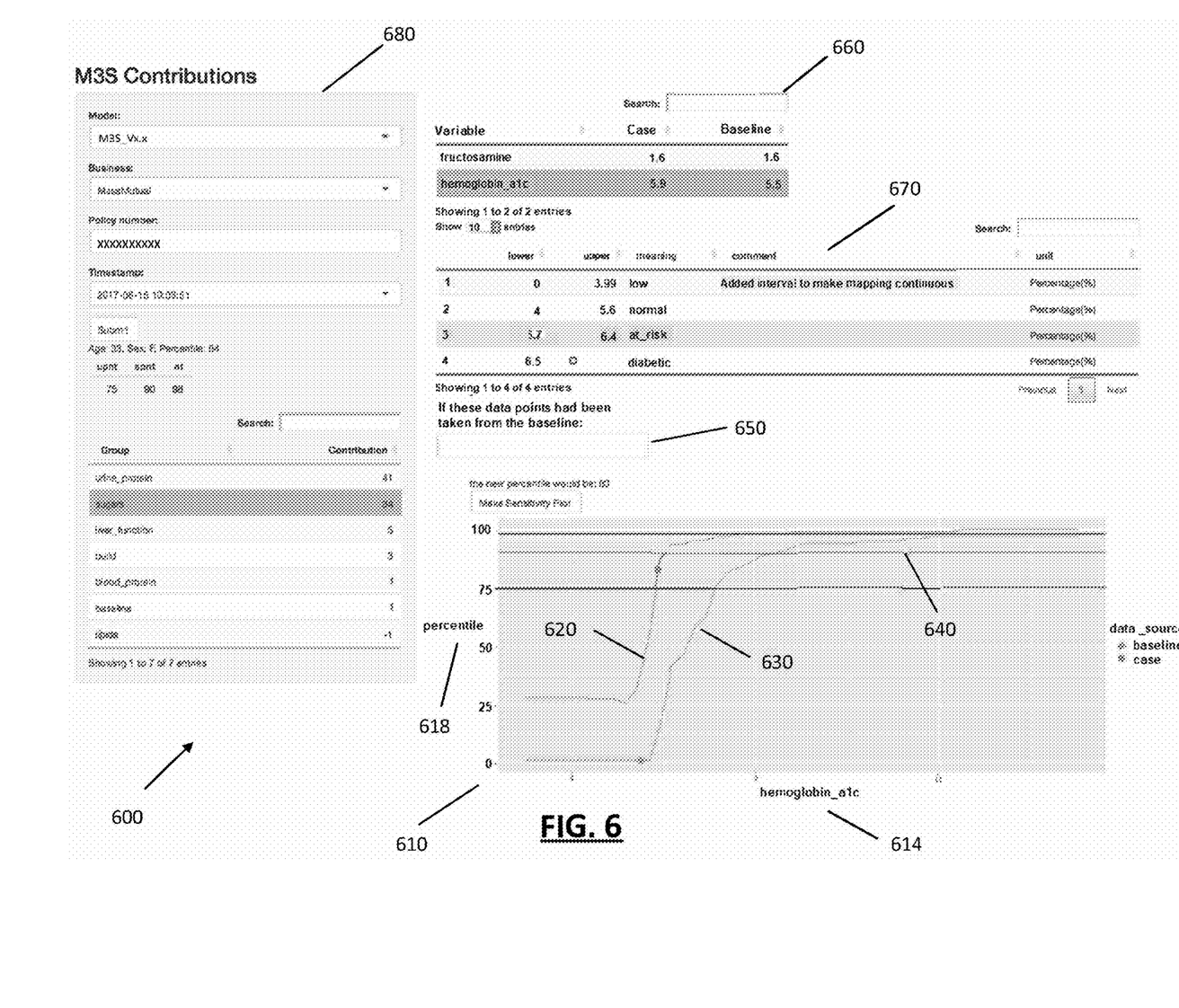
FIG. 6 shows a screen shot of an interactive dashboard of an additive contributions model for a machine learning underwriting system, according to an embodiment.

The screen shot of FIG. 6 shows a model interpretability tool incorporating an interactive dashboard 600, which is displayed as a graphical user interface, such a webpage on a browser. This tool was used to explore contribution values of test cases passed through the predictive machine learning underwriting model. For a given policy number and a mortality risk model, the tool displayed the SHAP values for each group and other information about the case's data. The model interpretability tool 600 gives users a way to explore conditional signals that are aggregated into the SHAP value. Once an interpretable feature is selected, a user has the option to explore the marginal contributions $\varnothing_i^S$ that make up the SHAP value. Users can thereby explore how that group interacts with other variables.

In mapping from the interpretable space to the original data space, $h_x(z)$ is defined so that for features i for which $z_i=0$, the corresponding data point $x_i$ is imputed to be a median value or mode for an age-sex cohort. The imputations in which each variable takes the mean value (if numeric) or mode are called "baseline" values or baseline contributions herein. Using a form 650 "If these features had been taken from the baseline," a user can choose a subset of interpretable feature group S and see how this choice affects the output $f(h_x(z_{-S}))$. The formula specifies $-S$ to represent the interpretable features not taken from the baseline.

Using variable selection window 660, users can select an original feature i and optionally a subset S. Based on the selected features, the tool generates a plot 610 of value of Hemoglobin A1C 614 against Percentile 618. Plot 610 shows how $f(h_x(z_{-S}))$ changes as $x_i$ changes. This function provides a way to define the marginal contribution $f(h_x(z_{S \cup i}))-f(h_x(z_{-S}))$. The plot 610 also shows how $f(h_x(z_0))$ changes as $x_i$ changes, thereby depicting the marginal contribution of feature i on the baseline or "null" case.

The dashboard screenshot of FIG. 6 displays a case in which the mortality model penalizes an individual for a value of Hemoglobin A1C known to be an unhealthy range. In plot 610, upper line 620 ("case") shows how the individual's percentile changes with this variable. The line 620 shows that had the value been lower and everything else been the same, the person could have been below the threshold level 640 required for the best risk class. Lower line 630 ("baseline") shows percentile changes of a baseline person with this variable.

Table 670 shows upper and lower thresholds and meanings ("low," "normal," "at risk," and "diabetic") assigned by the mortality model to various value ranges of the Hemoglobin A1C variable. A dashboard panel 680 shows related information on mortality model contributions, e.g., that 34 of the individual's 84 percentile points are attributed, overall, to the sugar values shown at the top.

Users such as model developers can apply the interpretability tool 600 to selected model covariates to identify risk factors that exhibit inconsistencies and undesirable behavior in an underwriting machine learning predictive model. By employing dynamic model retraining to a selected covariate, embodiments disclosed herein can dynamically retrain the underwriting machine learning model to improve model performance. In an example, the tool 600 helped users visualize that a machine learning underwriting model was imposing inappropriate penalties for a clinical risk factor that was healthy. On applying dynamic model retraining to a covariate corresponding to the selected clinical risk factor, the algorithmic underwriting system updated model parameters for the clinical risk factor to fair and reliable levels.

Figure 7:
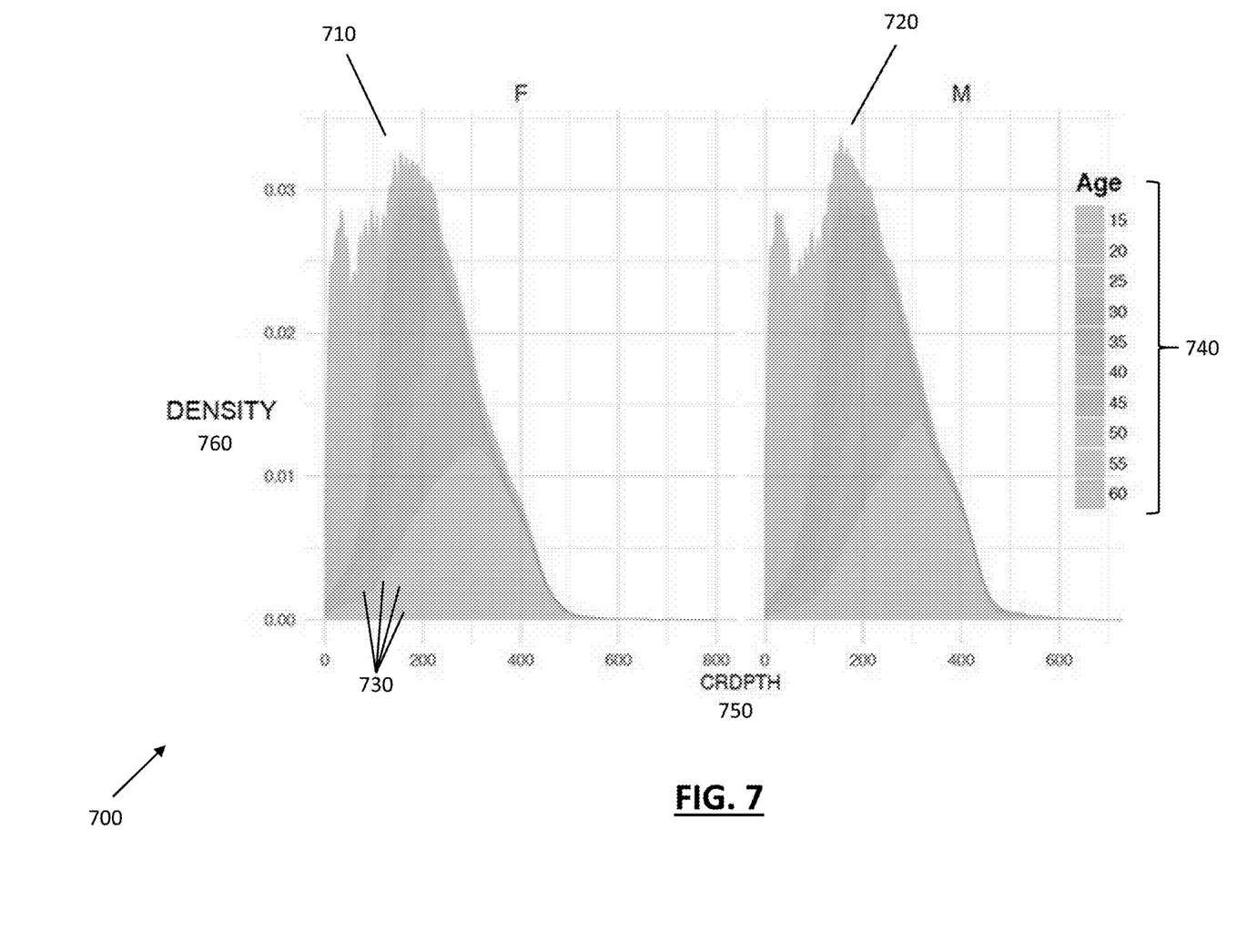
FIG. 7 displays a density plot of a model variable in training data conditioned on 5-year age and sex bands of applicant, according to an embodiment.

FIG. 7 displays a density plot of a model variable in training data conditioned on 5-year age and sex bands of applicant. The density plot 700 is a smoothed, continuous version of a histogram estimated from the training data for the variable CRDPTH (age of oldest account) 750. The density plots are separated into data for female applicants at 710 and data for male applicants at 720. Data bands 730 in the density plots correspond to five-year age ranges, as shown at the legend 740. Variable CRDPTH 750 is the x-axis of plots of probability density function 760. The probability density 760 represents the probability per unit of the variable CRDPTH. FIG. 7 shows that a model variable, such as non-clinical covariate CRDPTH, can exhibit significant distributional differences conditioned on applicant demographics.

While various aspects and embodiments have been disclosed, other aspects and embodiments are contemplated. The various aspects and embodiments disclosed are for purposes of illustration and are not intended to be limiting, with the true scope and spirit being indicated by the following claims.

The foregoing method descriptions and the interface configuration are provided merely as illustrative examples and are not intended to require, or imply, that the steps of the various embodiments must be performed in the order presented. As will be appreciated by one of skill in the art, the steps in the foregoing embodiments may be performed in any order. Words such as "then," "next," etc., are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code, with it being understood that software and control hardware can be designed to implement the systems and methods based on the description here.

When implemented in software, the functions may be stored as one or more instructions or codes on a non-transitory computer-readable or processor-readable storage medium. The steps of a method or algorithm disclosed here may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

What is claimed is:

1. A computer-implemented method for training predictive machine learning models for mitigating drift by dynamically updating quantitative contributions of covariate data comprising:

accessing, by a processor, a training dataset comprising data points including a plurality of covariates of a predictive machine learning model, wherein the predictive machine learning model is configured to generate predictions for the plurality of covariates and a net classification based on quantitative contributions of the plurality of covariates, wherein the training dataset comprises a plurality of historical application records associated with time metrics failing within a time period;
selecting, by the processor, one of the plurality of covariates representing a health characteristic of the predictive machine learning model, wherein each covariate is associated with one or more indicators;
selecting, by the processor, an indicator associated with the selected covariate;
generating, by the processor, a historical data distribution for selected covariate over a range of the selected indicator by applying the predictive machine learning model to the training dataset;
determining, by the processor, a current data distribution for the selected covariate over the range of the selected indicator by applying the predictive machine learning model to a test dataset comprising data points associated with time metrics falling within a recent time period;
when a comparison of the current data distribution with the historical data distribution indicates a change in data patterns exceeding a predetermined threshold,
automatically updating, by the processor, one or more parameters of the predictive machine learning model by reassigning a quantitative contribution of the selected covariate; and
training, by the processor, the predictive machine learning model to generate the net classification with the reassigned quantitative contribution of the selected covariate using the training dataset of historical application records.

2. The method of claim 1, wherein the comparing step calculates a covariate shift of the current data distribution relative to the historical data distribution.

3. The method of claim 2, wherein the updating one or more parameters of the predictive machine learning model comprises eliminating the selected covariate from the predictive machine learning model.

4. The method of claim 2, wherein the updating one or more parameters of the predictive machine learning model comprises eliminating the selected covariate from the predictive machine learning model if the selected covariate is not a high importance feature of the predictive machine learning model.

5. The method of claim 1, wherein the updating one or more parameters of the predictive machine learning model comprises applying a temporal adjustment to the selected covariate in each of the plurality of historical application records, wherein the temporal adjustment is based on the time metric of each of the historical application records.

6. The method of claim 1, wherein the predetermined threshold comprises a value of temporal drift of the current data distribution relative to the historical data distribution.

7. The method of claim 1, wherein the plurality of historical application records represent policies issued from the historical application records, and the time metric comprises a policy date.

8. The method of claim 1, wherein the plurality of historical application records represent policies declined or not taken from the historical application records, and the time metric comprises an application date.

9. The method of claim 1, wherein the classification comprises an assignment to one of several classification groups based upon an algorithmic rule for assigning to one of several classification groups based on a model prediction for the selected covariate representing the health characteristic.

10. The method of claim 9, wherein the updating one or more parameters of the predictive machine learning model comprises updating the algorithmic rule to reassign to one of the several classification groups based on the model prediction for the selected covariate representing the health characteristic.

11. The method of claim 1, wherein the predictive machine learning model is a probabilistic model, and wherein the historical data distribution and the current data distribution are probability distributions.

12. The method of claim 1, wherein the method further comprises:
generating, by the processor, at least one covariate contribution corresponding to the plurality of covariates based on the predictions for the plurality of covariates and the quantitative contributions of the plurality of covariates; and
presenting, by the processor to a user device, a graphical user interface with graphical indicators displaying an impact of each covariate contribution on the net classification, wherein the net classification is determined as a combination of the covariate contributions.

13. A system for training predictive machine learning models for mitigating drift by dynamically updating quantitative contributions of covariate data comprising:
an analytical engine server containing a processor configured to execute a plurality of non-transitory computer-readable instructions configured to:
access a training dataset comprising data points including a plurality of covariates of a predictive machine learning model, wherein the predictive machine learning model is configured to generate predictions for the plurality of covariates and a net classification representative of a mortality risk based on quantitative contributions of the plurality of covariates, wherein the training dataset comprises a plurality of historical application records associated with time metrics failing within a time period;
select one of the plurality of covariates representing a health characteristic of the predictive machine learning model, wherein each covariate is associated with one or more indicators;
select an indicator associated with the selected covariate;
generate a historical data distribution for selected covariate over a range of the selected indicator by applying the predictive machine learning model to the training dataset;
determine a current data distribution for the selected covariate over the range of the selected indicator by applying the predictive machine learning model to a test dataset comprising data points associated with time metrics falling within a recent time period;
when a comparison of the current data distribution with the historical data distribution indicates a change in data patterns exceeding a predetermined threshold,
automatically update one or more parameters of the predictive machine learning model by reassigning a quantitative contribution of the selected covariate; and
train the predictive machine learning model to generate the net classification with the reassigned quantitative contribution of the selected covariate using the training dataset of historical application records.

14. The system of claim 13, wherein the comparison calculates a covariate shift of the current data distribution relative to the historical data distribution.

15. The system of claim 13, wherein the automatic update applies a temporal adjustment to the selected covariate in each of the plurality of historical application records, wherein the temporal adjustment is based on the time metric of each of the historical application records.

16. The system of claim 13, wherein the predetermined threshold comprises a value of temporal drift of the current data distribution relative to the historical data distribution.

17. The system of claim 13, wherein the analytical engine server is further configured to:
   generate at least one covariate contribution corresponding to the plurality of covariates based on the predictions for the plurality of covariates and the quantitative contributions of the plurality of covariates; and
   present a graphical user interface to a user device with graphical indicators displaying an impact of each covariate contribution on the net classification, wherein the net classification is determined as a combination of the covariate contributions.

* * * * *